United States Patent [19]

Brodsky et al.

[11] 4,128,536

[45] Dec. 5, 1978

[54] CYANO-OLIGOMER COMPOSITIONS AND PROCESSES THEREOF

[75] Inventors: Lee Brodsky, Parsippany; Donald H. Lorenz, Basking Ridge; Suzanne B. Nelsen, Bergenfield; Shu T. Tu, E. Brunswick, all of N.J.

[73] Assignee: GAF Corporation, New York, N.Y.

[21] Appl. No.: 865,666

[22] Filed: Dec. 29, 1977

[51] Int. Cl.$^2$ .............................................. C08G 18/00
[52] U.S. Cl. ........................................ 427/54; 106/20; 106/35; 204/159.19; 204/159.22; 260/859 R; 260/895; 204/159.23; 204/159.15
[58] Field of Search ............... 260/77.5 CR, 77.5 AN, 260/77.5 AM, 859 R, 895; 106/20, 35, 287 R; 204/159.19, 159.22

[56] References Cited

U.S. PATENT DOCUMENTS

| | | |
|---|---|---|
| 3,425,999 | 2/1969 | Axelrood et al. ............ 260/77.5 AP |
| 3,829,531 | 8/1974 | Graff ............................ 260/77.5 CR |
| 3,892,714 | 7/1975 | Sampson et al. ............. 260/77.5 CR |

*Primary Examiner*—M. J. Welsh
*Attorney, Agent, or Firm*—Walter C. Kehm; Joshua J. Ward

[57] ABSTRACT

A novel ultra-violet absorber comprising a cyano-oligomer of Formula I of FIG. 1 of the drawings wherein $(Ar)_1$, $(Ar)_2$, $R^1$, $R^2$, $R^3$, $R^4$ and Y are organic radicals is given. A radiation curable coating composition with the novel cyano-oligomer, urethane oligomers and vinyl monomers is also given. A process for curing the coating is also disclosed.

32 Claims, 9 Drawing Figures

FIG.1 FORMULA I
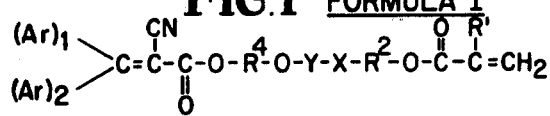
FIG.2 FORMULA II
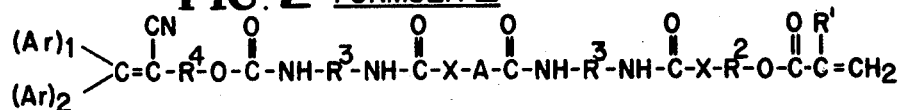
FIG.3 FORMULA III
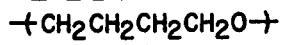
FIG.4 FORMULA IV
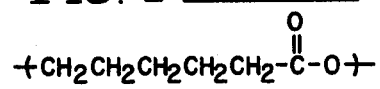
FIG.5 FORMULA V
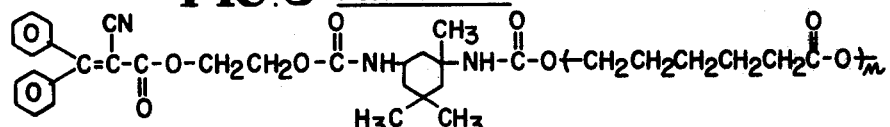
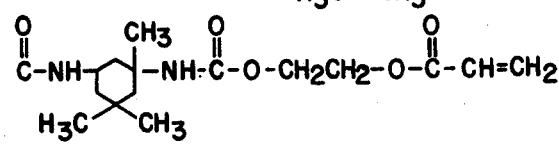
FIG.6 FORMULA VI
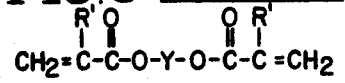
FIG.7 FORMULA VII
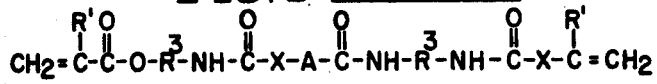
FIG.8 FORMULA VIII
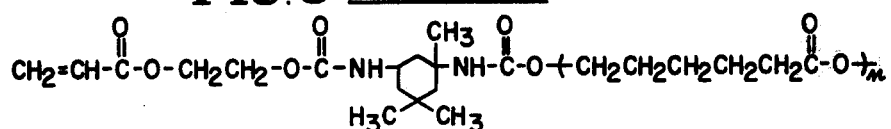
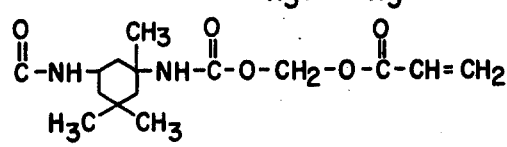
FIG.9 FORMULA IX
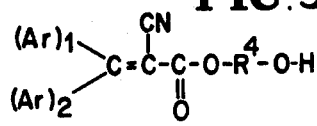

CYANO-OLIGOMER COMPOSITIONS AND PROCESSES THEREOF

CROSS REFERENCE TO RELATED APPLICATIONS (a) U.S. application Ser. No. 865,663 filed concurrently with this application under attorney Docket Number DN-967 disclosing and claiming different but related subject matter.

(b) U.S. application Ser. No. 865,664 filed concurrently with this application under attorney Docket Number DN-967/A disclosing and claiming different but related subject matter.

(c) U.S. application Ser. No. 865,665 filed concurrently with this application under attorney Docket Number DN-1041 disclosing and claiming certain novel ultra-violet light absorbers used in synthesizing the cyano-oligomers of the present invention.

Coating compositions which are curable under the influence of radiation in general and ultra-violet light in particular are well known.

U.S. application Ser. No. 777,031 filed Mar. 4, 1977, is prior art. This application discloses preferred oligomers with vinyl monomers to give coating compositions which are curable under the influence of radiation. While these coating compositions are superior to known coating compositions they suffer from a number of disadvantages. These coating compositions do not contain an ultra-violet light absorber to prevent yellowing and weathering. The difficulty of incorporating ultra-violet absorbers in radiation cured coatings is well known. The absorbers function in the cured coating by absorbing the radiation and protecting the coating from degradation. However, during radiation curing ultra-violet light absorbers also absorb energy resulting in either too high an energy demand from an economic point of view or too slow a curing rate. Smaller amounts of ultra-violet absorber may be incorporated in the coating composition in order to employ radiation curing. However, this results in too small an amount of ulta-violet absorber present in the cured coating to function for an extended period of time. Futhermore, unfortunately, ultra-violet absorbers leach out of coating compositions leaving the material open to structural degradation.

Accordingly, it is an object of the present invention to provide an improved coating composition containing an ultra-violet absorber that is substaintially free of one or more of the disadvantages of prior radiation curable coating compositions.

Yet another object is to provide a coating composition that will produce a coating that is weather resistant, non-yellowing, scratch-resistant, stain resistant, abrasive-resistant and solvent-resistant.

Still another object is to provide a novel cyano-oligomer.

Another object is to provide a coating composition which employs a lower amount of ultra-violet absorber and is as effective as a coating comprising greater amounts of ultra-violet absorbers.

Yet another object is to provide a coating composition in which the ultra-violet absorber is non-leachable.

Other objects and advantages of the present invention will be apparent to those skilled in the art by reference to the following detailed description and drawings wherein:

FIG. 1 is Formula I.
FIG. 2 is Formula II.
FIG. 3 is Formula III.
FIG. 4 is Formula IV.
FIG. 5 is Formula V.
FIG. 6 is Formula VI.
FIG. 7 is Formula VII.
FIG. 8 is Formula VIII.
FIG. 9 is Formula IX.

The above and other objects are accomplished according to the present invention by providing a novel cyano-oligomer of Formula I wherein:

$(Ar)_1$ and $(Ar)_2$ are aromatic carbocyclic nuclei of the benzene series and are independently selected from the group consisting of phenyl, alkyl phenyl, halo phenyl, carboxamido phenyl, sufonamido phenyl, carbalkoxy phenyl, cyano phenyl, acetyl phenyl, benzoyl phenyl, phenyl substituted phenyl and alkyl phenyl substituted phenyl;

$R^1$ is hydrogen or methyl;

$R^2$ is lower alkylene;

$R^4$ is lower alkylene;

X is oxygen or nitrogen; and

Y is a urethane residue.

The cyano-oligomer is combined with an oligomer of Formula VI shown in FIG. 6, wherein $R^1$ is hydrogen or methyl and Y is a urethane radical, and a vinyl monomer to give a superior coating composition which may be cured by radiation or by electron beam.

The cyano-oligomer is produced by reacting a urethane prepolymer with an hydroxyalkyl cyano diarylester and preferably a vinyl ester capping agent. Synthesis of the prepolymer is given U.S. application Ser. No. 865,665 filed concurherewith under attorney docket number DN-1041.

The prepolymers are produced by reacting a polyol such as polytetrahydrofuran, polycaprolactone polyol and other polyols with a diisocyanate to produce a diisocyanate terminated prepolymer. The diisocyanate terminated prepolymer is then reacted with hydroxyalkylcyanodiarylester usually with a capping agent. If only the hydroxyalkylcyanodiarylester were used then the cyano-oligomer has the ultra violet absorber at both ends of the prepolymer and would not be polymerizable in a coating formulation. Preferred cyano-oligomers of Formula I are given by Formula II and Formula V shown in FIGS. 2 and 5 respectively.

Preferred cyano-oligomers are of Formula II wherein $(Ar)_1$ and $(Ar)_2$ have the above definitions and $R^1$ is methyl or hydrogen;

$R^2$ is lower alkylene;

$R^3$ is aliphatic or cycloaliphatic;

$R^4$ is lower alkylene;

A is a polyol or caprolactone polyol radical with a repeating unit of 2 to 50 and preferably 5 to 20; and X is oxygen or nitrogen.

A may be a radical of Formula III shown in FIG. 3 based on polytetrahydrofuran or a caprolactone radical of Formula IV shown in FIG. 4.

The polytetrahydrofuran is commercially available from the Du Pont Company under the tradenames "TERRECOL-650", "TERRECOL-1000", and "TERRECOL-2000", and from the Quaker Oats Company under the tradenames "POLYMEG-650", "POLYMEG-1000", and "POLYMEG-2000". In the above tradenames the number indicates the approximate molecular weight of the polytetrahydrofuran. The most preferred polytetrahydrofuran is that having a molecular weight of 650.

The caprolactone polyols are commercially available from Union Carbide Corp. under the tradenames "NIAX CAPROLACTONE POLYOLS" — PCP-0200, PCP-0210, PCP-0230, PCP-0240, PCP-0300, PCP-0301 and PCP-0310. The 0200 series are diols with molecular weights 530, 830, 1250 and 2000 respectively. The 0300 series are triols with molecular weights 540, 300 and 900 respectively.

The capping agents useful in the present invention are those that will react with one end of the isocyanate terminated prepolymer to produce the cyano-oligomers of Formula I. In general, any capping agent having a terminal amine or hydroxyl group and also having an acrylic acid or methacrylic acid moiety is suitable. Examples of suitable capping agents include among others hydroxyethyl acrylate, hydroxyethyl methacrylate, hydroxypropyl acrylate, hydroxypropyl methacrylate, hydroxybutyl acrylate, hydroxybutyl methacrylate, hydroxypentyl acrylate, hydroxypentyl methacrylate, hydroxyhexyl acrylate, hydroxyhexyl methacrylate, aminoethyl acrylate, and aminoethyl methacrylate.

The diisocyanates useful to produce the prepolymer are aliphatic and cycloaliphatic diisocyanates that will react with terminal hydroxyl groups present on the polytetrahydrofuran or caprolactone polyol. Of course, aromatic diisocyanates undergo the same reaction but do not yield a product as satisfactory as that obtained by the use of aliphatic diisocyanates. Examples of suitable diisocyanates include, among others, isophorone diisocyanate, 4,4'-dicyclohexylmethane-diisocyanate available commercially from the Du Pont Company under the trade name "Hylene W", and trimethyl-hexamethylene-diisocyanate, 1,6-hexamethylene-diisocyanate, 2,4,4-trimethyl 1,6-hexylene-diisocyanate, octadecylene-diisocyanate and 1,4-cyclohexylene-diisocyanate. The preferred diisocyanates are isophorone diisocyanate (3-isocyanatomethyl-3,5,5-trimethyl-cyclohexyl-isocyanate) and 4,4'-dicyclohexylmethane-diisocyanate.

Synthesis of the hydroxyalkylcyanodiarylester is given in U.S. application Ser. No. 865,665 filed concurrently herewith under attorney docket number DN-1041. These compounds are represented by Formula IX shown in FIG. 9 wherein $(Ar)_1$ and $(Ar)_2$ are aromatic carbocyclic nuclei of the benzene and naphthalene series and are independently selected from the group consisting of phenyl, alkyl phenyl, halo phenyl, hydroxy phenyl, alkoxy phenyl, hydroxy-alkoxy phenyl, carboxy phenyl, carboxamido phenyl, sulfonamido phenyl, carbalkoxy phenyl, cyano phenyl, acetyl phenyl, benzoyl phenyl, phenyl substituted phenyl, alkyl phenyl substituted phenyl, phenoxy phenyl alkyl substituted phenoxy phenyl, alkoxy phenyl substituted phenyl, hydroxy phenyl substituted phenyl, and naphthyl, and $R^4$ is a lower alkylene. Substituents on the carbocyclic nuclei of the benzene and naphthalene rings are sterically prevented from combining with the oligomers. Suitable substituents for this invention are defined for Formula I.

These compounds may be prepared by condensation of a benzophenone with an hydroxy alkyl cyano acetate. Alternatively, an acrylic acid substituted with aromatic nuclei and a cyanato group may be directly esterified with a dihydric alcohol. Another method of synthesizing the novel compounds is a transesterification reaction of an alkyl cyano diaryl acrylate with a dihydric alcohol. A preferred hydroxy alkyl cyano diaryl acrylate, beta-hydroxyethyl-2-cyano-3, 3-diphenyl-acrylate is available from the GAF Corporation.

In preparing the coating composition of cyano-oligomer, oligomer and vinyl monomer, oligomers of Formula VI generally describe the type of oligomer wherein $R^1$ is hydrogen or methyl and Y is a urethane radical. Oligomers of Formula VII shown by FIG. 7 are preferred in which $R^3$ is aliphatic or cycloaliphatic, X is oxygen or nitrogen and A is a polyol radical such as polycaprolactone. These radicals are shown by Formula III and Formula IV.

A preferred oligomer is given by Formula VIII shown by FIG. 8 wherein $n$ is 2 to 50 and preferably 5 to 20. Snythesis of suitable oligomers is shown in U.S. application Ser. No. 777,031 filed Mar. 4, 1977. In one-step synthesis of the cyano-oligomer and coating composition the prepolymer and oligomer employ the same diisocyanate, polyol and capping agent.

Any vinyl monomer heretofore found to be copolymerizable with the above-described oligomers can be employed as the vinyl monomer in the present invention. Examples of suitable vinyl monomers include, among others, styrene, acrylonitrile, a-methyl-styrene, chlorostyrene, vinyl toluene, and N-vinyl-2-pyrrolidone. N-vinyl-2-pyrrolidone is a preferred monomer. Acrylic acid esters with a boiling point of at least 200° C. at 760mm Hg are also useful. Examples of suitable acrylic acid esters include, among others, 1,4-butanedioldiacrylate, 1,6-hexanedioldiacrylate, neopentylglycoldiacrylate, pentaerythritol-tetramethacrylate, trimethylolpropane-triacrylate, ethylhexyl-acrylate, ethylhexyl-methacrylate, pentyl-acrylate, hexyl-acrylate, and cyclohexyl-methacrylate. 1,4-butanedioldiacrylate and 1,6-hexanedioldiacrylate are the preferred acrylic acid esters.

The ratio of the cyano-oligomer to oligomer is generally 1:100 to 5:100. At lower ratios there is insufficient cyano-oligomer to protect the coated material. Higher ratios are possible but are expensive and wasteful. A non-leaching, non-yellowing coating can be achieved with a weight ratio of 2:100 cyano-oligomer to oligomer. While this is generally less ultra-violet absorber than has been used in the prior art, the chemical binding of the ultra-violet absorber to the prepolymer and subsequent polymerization makes the ultra-violet light absorber non-leaching in the coating. This results in a long period of protection for the coated substrate previously not possible.

The weight ratio of the oligomer to the vinyl monomer is generally 1:9 to 9:1 and preferably 1:3 to 3:1. At higher ratios, e.g., those rich in oligomers, the uncured coating composition tends to have too high a viscosity. This higher viscosity makes it difficult to apply the uncured coating composition to the substrate. At lower ratios the resultant cured coating composition tends to be too hard and inflexible.

If the curing is done with ultra-violet light a photo-initiator is used. Suitable photo-initiators include vicinal ketaldonyl compounds (i.e., compounds containing a ketone group and an aldehyde group) such as diacetyl, benzil, 2,3-pentanedione, 2,3-octanedione, 1-phenyl-1,2-butanedione, 2,2-dimethyl-4-phenyl-3,4-butanedione, phenyl-glyoxal, diphenyl-triketone; aromatic diketones, such as anthraquinone; acyloins, such as benzoin; pivaloin acryloin ethers, such as benzoin-methyl-ether, benzoin-ethyl-ether, benzoin-butyl-ether, benzoin-isobutyl-ether, benzoin-phenyl-ether; alpha-hydrocarbon substituted aromatic acyloins including alpha-methyl-methylbenzoin, alpha-alkyl-benzoin, as in U.S. Pat. No. 2,722,512, and phenylbenzoin; diaryl ketones, such as benzophenone and dinaphthyl ketone; and organic disulfides, such as diphenyldisulfide. The photo-initiator can also include a synergistic agent, such as a tertiary amine, to enhance the conversion of photo-absorbed energy to polymerization initiating free radicals. Diethoxyacetophenone available from Union Carbide Corp., dimethoxyphenylacetophenone such as IRGACURE 651 available from Ciba-Geigy or a benzoin ether such as Vicure 10 available from Stauffer Chemical Co. are preferred. The photo-initiator is present in the coating composition in an amount sufficient to initiate the desired polymerization under the influence of the amount of actinic light energy absorbed. The coating composition generally contains from 0.01 to 5 weight percent of photo-initiator based on the weight of the coating composition.

The coating composition can also contain an addition polymerization inhibitor to prevent undesirable auto-polymerization of the coating composition in storage prior to use. Examples of suitable addition polymerization inhibitors include, among others, di(1,4-sec-butylamino)benzene available from the Du Pont Company under the trade name "Anti-Oxidant 22" and phenothiazine available from Tefenco Chemical Co. The addition polymerization inhibitor is present in an amount sufficient to prevent auto-polymerization and is generally present in an amount from 100 to 300 parts per million based on the weight of the coating composition.

The coating composition can also contain a surfactant. The preferred surfactants are silicone surfactants such as that available from the Dow Corning Corporation under the trade name "DC-193". The surfactant is present in an amount necessary to reduce the surface tension of the coating composition and reduce its viscosity to the desired levels. The surfactant generally comprises from 0.1 to 5 weight percent based on the weight of the coating composition.

The coating compositions of the present invention can also contain other conventional additives, such as flow control and leveling agents, organic and inorganic dyestuffs and pigments, fillers, plasticizers, lubricants, and reinforcing agents, such as alumina, silica, clay, talc, powdered glass, carbon black and fiberglass.

The coating compositions of the present invention can be cured by applying them as a film 0.5–3.0 mil thick on the substrate. Curing is preferably done under an inert atmosphere of nitrogen. The coating composition may be applied as a thin film in any conventional manner such as by spraying, brushing, dipping, roll coating and the like.

Conventionally, the film on the substrate is positioned to travel on a conveyor and pass under a source of a free radical generator, such as an actinic radiation source or an electron beam. The coated side of the substrate is exposed to the radiation for a time sufficient to effect polymerization and convert the film into an adherent, tough, flexible coating.

As used herein the term actinic radiation refers to any radiation source which will produce free radicals and induce addition polymerization of vinyl bonds. The actinic radiation is suitably in the wave length of 2000 to 7500, preferably 2000 to 4000 Angstroms. A class of actinic light useful herein is ultra-violet light and other forms of actinic radiation are the sun, sunlamps, carbon arc lamps, xenon arc lamps, mercury vapor lamps, tungsten halide lamps, lasers, and fluorescent lamps with ultra-violet light emitting phosphors.

The preferred electron beam source contains a wide curtain of electrons directly from a linear cathode. A curtain of electrons from the cathode, accelerated to a high velocity by a 200 KV potential, emerges from the chamber through a foil window into the coated substrates. This is available as Electroncurtain$^{TM}$ from Energy Sciences, Inc.

The electron beam curing of the coating compositions as described above is cured at less than 5 Mrads and generally at 1–2 Mrads. Curing at greater than 8 Mrads is deemed unacceptable because of the high cost.

The invention is further illustrated by the following examples in which all parts and percentages are by weight unless otherwise indicated. These non-limiting examples are illustrative of certain embodiments designed to teach those skilled in the art how to practice the invention and to represent the best mode contemplated for carrying out the invention.

The following abbreviations are used in the following examples:

VP: N-vinyl-2-pyrrolidone
B,DDA: 1,4-butanedioldiacrylate
IPDI: isophorone-diisocyanate
HEA: hydroxyethyl-acrylate
HECDA: hydroxyethyl-2-cyano-3,3-diphenyl acrylate
PCP-0200: polycaprolactone polyol having a molecular weight of 530
Prepolymer: 2 moles IPDI to 1 mole PCP-0200
EHA: ethyl hexyl acrylate
Phenothiazine: Polymerization inhibitor
T-12: Catalyst dibutyl tin dilaurate
Vicure 10: photoinitiator
DC-193: surfactant

EXAMPLE 1

The example is illustrative of preparing the novel cyano-oligomer. The given amounts of the following items are reacted together.

| ITEM | NAME | AMOUNT | |
|---|---|---|---|
| | | Gms | Moles |
| A | HECDA | 277.0 | 1.0 |
| B | PCP-0200/IPDI Prepolymer | 974.6 | 1.0 |
| C | HEA | 116.0 | 1.0 |

Item A is dissolved in Item C and added drop by drop to Item B. The temperature is maintained at 56° C. The reaction continues for 3 hours and the product, a compound of Formula V wherein $n$ is 2 is obtained.

EXAMPLE 2

This example is illustrative of synthesizing the cyano-oligomer, oligomer and vinyl monomer coating composition.

The given quantities of the following items are combined as indicated.

| ITEM | NAME | QUANTITY | |
|---|---|---|---|
| | | Gms | Moles |
| A | EHA | 267.4 | 1.46 |
| B | IPDI | 240.4 | 1.08 |
| C | Phenothiazine | 0.06 | |
| D | T-12 (10% in EHA) | 3.8 | |
| E | PCP-0200 | 254.4 | 0.48 |
| F | HECDA | 26.8 | 0.1 |
| G | HEA | 110.8 | 0.96 |
| H | VP | 178.0 | 1.60 |
| I | B,DDA | 148.9 | 0.65 |
| J | Vicure 10 | 24.6 | |

-continued

| ITEM | NAME | QUANTITY |
|---|---|---|
| K | DC-193 | 6.2 |
| | TOTAL | 1262 |

*in two portions, 2.2 and 1.6 ml., respectively

The reaction proceeds in a 2 liter reactor under dry air. Items A, B and C are charged to the reactor. The temperature is raised to 45° C. and 2.2 ml. of T-12 is added with vigorous stirring. The temperature is raised to 50° C. while E is added, drop by drop, in a period of 45 minutes. The second portion of T-12 (1.6ml) is added, and the temperature is raised to 56° C. and maintained for 2 hours. F is dissolved in G and is delivered, drop by drop in a period of 35 minutes, and the temperature maintained for 3½ hours. Then H and I are added and the temperature is lowered to 35° C. while J and K are mixed in. The material is stirred for another 15 minutes and discharged.

EXAMPLE 3

This example illustrates applying the inventive coating composition of Example 3 to a vinyl sheet. A 1.5 mil film is applied on a vinyl sheet. The coated vinyl sheet is cured by passing through a PPG QC Lab UV oven containing two 200 w/in. UV lamps at a speed of 50 ft/min/2 lamps. No solvent was left after the cure. The coating is dry, flexible, scratch-resistant, stain-resistant, abrasion-resistant, and solvent-resistant. The curing rate is 50 ft/min/2 lamps. The chemical bonded HECDA was permanent and difficult to remove. After exhaustive extraction with chloroform for 48 hours, UV absorption analysis showed that less than one fourth of the HECDA applied had been removed. For films in which the HECDA is mixed but not chemically formed into a cyano-oligomer the loss is nearly total under the same analytical conditions.

Coatings of 3 mil and 1.5 mil of the product of Example 3 were applied onto PVC glazings and cured as described above.

These coatings, containing 2% of HECDA chemically bound, were exposed in a Weather-Ometer for a period of 2 weeks. The results were compared to a similarly prepared coating in which the HECDA is only mechanically mixed and at a level of 3%. No yellowness was observed for any of the coatings. It is remarkably surprising that a significantly lower amount of HECDA can be as effective as the larger amount of HECDA if the HECDA is formed into a cyano-oligomer. The smaller amount in conjunction with its non-leaching property makes the cyano-oligomer a superior ultra-violet absorber in coating compositions.

EXAMPLE 4

This example is illustrative of curing the cyano-oligomer, oligomer and vinyl monomer coating composition under an electron beam. The composition of Example 3 is used (with the omission of Vicure 10, Item J). The coating composition is applied to a thickness of 1.5 mils and 3 mils on a sheet of PVC. One Mrad was sufficient to cure both coatings. The product was similar to the product obtained in Example 3.

Although the invention has been described in considerable detail with reference to certain preferred embodiments thereof, it will be understood that variations and modifications can be effected within the spirit and scope of the invention as described above and as defined in the appended claims.

What is claimed is:

1. A cyano-oligomer of Formula I wherein
   (Ar)$_1$ and (Ar)$_2$ are aromatic carbocyclic nuclei of the benzene series and are independently selected from the group consisting of phenyl, alkyl phenyl, halo phenyl, carboxamido phenyl, sulfonamido phenyl, carbalkoxy phenyl, cyano phenyl, acetyl phenyl, benzoyl phenyl, phenyl substituted phenyl and alkyl phenyl substituted phenyl;
   $R^1$ is hydrogen or methyl;
   $R^2$ is lower alkylene;
   $R^4$ is lower alkylene;
   X is oxygen or nitrogen; and
   Y is a urethane radical.

2. A cyano-oligomer of Formula II wherein
   (Ar)$_1$ and (Ar)$_2$ are aromatic carbocyclic nuclei of the benzene series and are devoid of nitro and nuclear bonded amino groups and are independently selected from the group consisting of phenyl, alkyl phenyl, halo phenyl, carboxamido phenyl, sulfonamido phenyl, carbalkoxy phenyl, cyano phenyl, acetyl phenyl, benzoyl phenyl, phenyl substituted phenyl and alkyl phenyl substituted phenyl;
   $R^1$ is hydrogen or methyl;
   $R^2$ is lower alkylene;
   $R^3$ is aliphatic or cycloaliphatic;
   $R^4$ is lower alkylene;
   A is a polyol radical with a repeating unit of 2 to 50 inclusive;
   X is oxygen or nitrogen.

3. A cyano-oligomer of Formula II as claimed in claim 2 wherein A is selected from the group consisting of radicals of Formula III and Formula IV.

4. A cyano-oligomer of Formula V wherein $n$ is an integer 5 to 20 inclusive.

5. A coating composition comprising:
   A. a cyano-oligomer of Formula I wherein
      (Ar)$_1$ and (Ar)$_2$ are aromatic carbocyclic nuclei of the benzene series and are independently selected from the group consisting of phenyl, alkyl phenyl, halo phenyl, carboxamido phenyl, sulfonamido phenyl, carbalkoxy phenyl, cyano phenyl, acetyl phenyl, benzoyl phenyl, phenyl substituted phenyl and alkyl phenyl substituted phenyl;
      $R^1$ is hydrogen or methyl;
      $R^2$ is lower alkylene;
      $R^4$ is lower alkylene;
      X is oxygen or nitrogen; and
      Y is a urethane radical;
   B. an oligomer of Formula VI and
   C. a vinyl monomer copolymerizable with said oligomers.

6. The coating composition of claim 5 further comprising an addition polymerization inhibitor present in an amount sufficient to avoid the auto-polymerization of the composition during storage.

7. The coating composition of claim 6 wherein the addition polymerization inhibitor is present in an amount from 100–300 parts per million based upon the weight of the composition.

8. The coating composition of claim 5 further comprising a surfactant.

9. The coating composition of claim 8 wherein the surfactant is present in an amount from 0.1 to 5 weight percent based upon the weight of the composition.

10. The coating composition of claim 8 wherein the surfactant is a silicone surfactant.

11. The coating composition of claim 5 wherein the weight ratio of oligomer to vinyl monomer is from 1:9 to 9:1.

12. The coating composition of claim 5 further comprising a photo-initiator present in an amount sufficient to initiate the desired polymerization under the influence of the amount of actinic light energy absorbed.

13. The coating composition of claim 12 wherein the photo-initiator is present in an amount from 0.01 to 5 weight percent based upon the weight of the composition.

14. The coating composition of claim 5 wherein the weight ratio of cyano-oligomer to oligomer is 1:100 to 5:100.

15. A coating composition comprising:
A. a cyano-oligomer of Formula II wherein
   $(Ar)_1$ and $(Ar)_2$ are aromatic carbocyclic nuclei of the benzene series and are independently selected from the group consisting of phenyl, alkyl phenyl, halo phenyl, carboxamido phenyl, sulfonamido phenyl, carbalkoxy phenyl, cyano phenyl, acetyl phenyl, benzoyl phenyl substituted phenyl and alkyl phenyl substituted phenyl,
   $R^1$ is methyl or hydrogen;
   $R^2$ is hydrogen or methyl;
   $R^3$ is aliphatic or cycloaliphatic;
   $R^4$ is lower alkylene;
   A is a polyol radical with a repeating unit of 2 to 50 inclusive; and
   X is oxygen or nitrogen;
B. an oligomer of Formula VII;
C. a vinyl monomer selected from the group consisting of N-vinyl-2-pyrrolidone, 1,4-butanedioldiacrylate and ethyl-hexyl-acrylate.

16. A coating composition of claim 15 wherein the weight ratio of A:B is 1:100 to 5:100.

17. A coating composition of claim 15 wherein the weight ratio of B:C is 1:9 to 9:1.

18. A coating composition of claim 15 wherein the weight ratio of B:C is 1:3 to 3:1.

19. The coating composition of claim 15 further comprising an addition polymerization inhibitor present in an amount sufficient to avoid the auto-polymerization of the composition during storage.

20. The coating composition of claim 19 wherein the addition polymerization inhibitor is present in an amount from 100 to 300 parts per million.

21. The coating composition of claim 15 further comprising a surfactant.

22. The coating composition of claim 21 wherein the surfactant is present in an amount from 0.1 to 5 weight percent based upon the weight of the composition.

23. The coating composition of claim 21 wherein the surfactant is a silicone surfactant.

24. The coating composition of claim 15 further comprising a photo-initiator present in an amount sufficient to initiate the desired polymerization under the influence of the amount of actinic light energy absorbed.

25. The coating composition of claim 24 wherein the photo-initiator is present in an amount from 0.01 to 5 weight percent based upon the weight of the composition.

26. A coating composition comprising:
A. a cyano-oligomer of Formula V wherein $n$ is 5 to 20 inclusive;
B. an oligomer of Formula VIII wherein $n$ is 5 to 20 inclusive;
C. a vinyl monomer selected from the group consisting of ethyl-hexyl-acrylate, N-vinyl-2-pyrrolidone and 1,4-butanedioldiacrylate;
D. a photo-initiator present in an amount from 0.01 to 5 weight percent based on the weight of the composition;
E. an addition polymerization inhibitor present in an amount from 100 to 300 parts per million;
F. a silicone surfactant present in an amount from 0.1 to 5 percent based on the weight of the composition;
   wherein the ratio A:B is 1:100 to 5:100 and
   wherein the ratio B:C is from 1:3 to 3:1.

27. A process for coating a substrate comprising in sequence the steps of:
I. contacting the substrate with a coating composition comprising:
   A. a cyano-oligomer or Formula I wherein
      $(Ar)_1$ and $(Ar)_2$ are aromatic carbocyclic nuclei of the benzene series and are independently selected from the group consisting of phenyl, alkyl-phenyl, halo-phenyl, carboxamido-phenyl, sulfonamido-phenyl, carbalkoxy-phenyl, cyano-phenyl, acetyl-phenyl, benzoyl phenyl, phenyl-substituted-phenyl and alkyl-phenyl substituted phenyl,
      $R^1$ is hydrogen or methyl;
      $R^2$ is lower alkylene;
      $R^4$ is lower alkylene;
      X is oxygen or nitrogen;
      Y is a urethane radical;
   B. an oligomer of Formula VI;
   C. a vinyl monomer copolymerizable with said oligomers; and then
II. exposing the coated substrate to a source of a free radical generator until a cured adherent dry polymerized coating is formed on the substrate.

28. A process of claim 27 wherein the source of a free radical generator is an ultra-violet light source.

29. A process of claim 28 wherein the curing is effected at a speed of 25–50 ft/min/lamp of the ultra-violet source.

30. A process of claim 27 wherein the source of a free radical generator is an electron beam.

31. A process for coating a substrate comprising in sequence the steps of:
I. contacting the substrate with a coating composition comprising:
   A. a cyano-oligomer of Formula II wherein
      $(Ar)_1$ and $(Ar)_2$ are aromatic carbocyclic nuclei of the benzene series and are independently selected from the group consisting of phenyl, alkyl phenyl, halo phenyl, carboxamido phenyl, sulfonamido phenyl, carbalkoxy phenyl, cyano phenyl, acetyl phenyl, benzoyl phenyl, phenyl substituted phenyl and alkyl phenyl substituted phenyl;
      $R^1$ is hydrogen or methyl;
      $R^2$ is lower alkylene;
      $R^3$ is aliphatic or cycloaliphatic;
      $R^4$ is lower alkylene;
      A is a polyol radical with a repeating unit of 2 to 50 inclusive;
      X is oxygen or nitrogen;
   B. an oligomer of Formula VII;

C. a vinyl monomer selected from the group consisting of N-vinyl-2-pyrrolidone, 1,4-butanedioldiacrylate and ethyl-hexyl-acrylate;

II. exposing the coated substrate to actinic radiation until an adherent, dry polymerized coating is formed on the substrate.

32. A process for coating a substrate comprising in sequence the steps of:

I. contacting the substrate with a coating composition comprising:

A. a cyano-oligomer of Formula V wherein $n$ is 5 to 20 inclusive;

B. an oligomer of Formula VIII wherein $n$ is 5 to 20 inclusive;

C. a vinyl monomer selected from the group consisting of ethyl-hexyl-acrylate, N-vinyl-2-pyrrolidone and 1,4-butane-dioldiacrylate;

D. a photo-initiator present in an amount from 0.01 to 5 weight percent based on the weight of the composition;

E. an addition polymerization inhibitor present in an amount from 100 to 300 parts per million;

F. a silicone surfactant present in an amount from 0.1 to 5 percent based on the weight of the composition;

wherein the weight ratio of A:B is 1:100 to 5:100 and wherein the weight ratio of B:C is from 1:3 to 3:1;

II. exposing the coated substrate to ultra-violet light to cure the coating at a speed of 25–50 feet/min/lamp to produce an adherent, dry polymerized coating on the substrate.

* * * * *